United States Patent
Kefalas et al.

(10) Patent No.: US 6,779,239 B2
(45) Date of Patent: Aug. 24, 2004

(54) METHOD FOR REMOVING A SEAL

(75) Inventors: Nikolaos Kefalas, Wesel (DE); Wolfram Krockow, Meerbusch (DE)

(73) Assignee: Siemens Aktiengesellschaft, Munich (DE)

( * ) Notice: Subject to any disclaimer, the term of this patent is extended or adjusted under 35 U.S.C. 154(b) by 4 days.

(21) Appl. No.: 10/239,295

(22) PCT Filed: Mar. 7, 2001

(86) PCT No.: PCT/EP01/02579

§ 371 (c)(1),
(2), (4) Date: Sep. 20, 2002

(87) PCT Pub. No.: WO01/70451

PCT Pub. Date: Sep. 27, 2001

(65) Prior Publication Data

US 2003/0101561 A1 Jun. 5, 2003

(30) Foreign Application Priority Data

Mar. 22, 2000 (EP) ............................................ 00106226

(51) Int. Cl.⁷ ............................................... B23P 19/04
(52) U.S. Cl. .............................. 29/402.01; 29/402.02; 29/402.03; 29/426.1; 29/426.5; 29/252; 29/235; 134/34; 134/22.18
(58) Field of Search ................... 29/402.01, 402.02, 29/402.03, 426.1, 426.5, 426.6, 252, 235, 421.1, 446, 450, DIG. 78, 282; 137/15.17; 134/34, 37, 103.2, 198, 22.12, 22.18, 42; 72/54, 56; 156/344; 83/53, 177

(56) References Cited

U.S. PATENT DOCUMENTS

| 3,915,739 A | * | 10/1975 | Maahs et al. ................... 134/21 |
| 5,078,161 A | * | 1/1992 | Raghavan et al. ............. 134/16 |
| 5,499,639 A | * | 3/1996 | Williams, Jr. ................... 134/7 |
| 5,738,730 A |   | 4/1998 | Tojo |
| 6,444,046 B1 | * | 9/2002 | Hillbrand ...................... 134/34 |

FOREIGN PATENT DOCUMENTS

| EP | 0 430 856 | 11/1990 |
| EP | 0 753 376 | 7/1996 |
| GB | 2 197 580 | 11/1987 |

* cited by examiner

Primary Examiner—David P. Bryant
Assistant Examiner—Jermie E. Cozart
(74) Attorney, Agent, or Firm—Harness, Dickey & Pierce, P.L.C.

(57) ABSTRACT

A method is disclosed for removing a seal that is fixed in a groove of a component. A highly pressurised jet of liquid is aimed at the seal or between the seal to free it from the groove. The method is particularly suitable for freeing a sealing strip in a rotor or in a housing of a turbine-type machine, and is considerably less time-consuming and expensive than the twisting-off method that has been used up until now.

17 Claims, 2 Drawing Sheets

METHOD FOR REMOVING A SEAL

The invention relates to a particularly inexpensive and simple method for removing a sealing means which is held in a groove of a component by means of a clamping means.

Such a sealing means is, for example, a sealing strip, which is fastened to a casing or a rotor of a turbomachine in order to seal the gap (between the shaft of the rotor and a guide vane fastened to the casing or between the casing and a rotor blade of the rotor) against a working medium, which is flowing through the turbomachine and drives the rotor. If, in this arrangement, a respective sealing strip on the casing or the guide vane and a respective sealing strip on the shaft or the rotor blade of the rotor are arranged alternately one behind the other, viewed in the axial direction of the rotor, this is referred to as a so-called labyrinth seal. The working medium no longer penetrates appreciably through this labyrinth of seals so that the power of the turbomachine is only slightly impaired by this loss of working medium.

For simplicity in what follows, reference is made to the casing of the turbomachine when the casing as such or a guide vane firmly connected to the casing is under discussion and reference is made to the rotor when the rotor as such or a rotor blade firmly connected to the rotor is under discussion.

The sealing strip protruding into the gap between the casing and the rotor is usually embodied with an L-shape on its fastening side. The fastening side, which is embodied in an L-shape, of the sealing strip is inserted into a groove on the casing or on the rotor. In order to fasten the sealing strip to the casing or to the rotor, a clamping means is subsequently introduced into the groove. As the clamping means, also called a calking element, a calking wire is worked into the groove with a chisel. The sealing strip is held firmly in the groove because of the high frictional forces developed by the calking wire.

In the case of turbomachines which are subjected to high temperatures, such as gas turbines or steam turbines, temperature-resistant materials—such, in particular, as highly heat-resistant metal alloys or steels—are employed for the sealing strip and also for the clamping means. The term "calking wire" is also usually employed for a metallic calking element.

Because of the high mechanical loads, the sealing strips in turbomachines usually exhibit, after several tens of thousands of hours, such wear that they can no longer fulfill their sealing function. Replacement sealing strips must therefore be fitted from time to time.

In order to exchange the sealing strip, it has previously been known art to machine-turn the clamping element or clamping means down in an expensive manner.

The object of the invention is to provide a method for removing a sealing means which is held in a groove of a component, which method requires less expenditure of time and is therefore more favorable, from the point of view of cost, as compared with methods from the prior art.

According to the invention, this object is achieved by a method for removing a sealing means which is held by a clamping means in a groove of a component, a fluid jet being directed into the groove at high pressure between the sealing means and the clamping means or between the clamping means and the component, by which means the clamping means at least is released from the groove.

Comprehensive investigations have shown that a fluid jet directed into a groove can generate such a high pressure that even a sealing means held in the groove by a steel clamping means can be released from the groove in a simple manner and in a fraction of the previously required time. In this process, no damage occurs to the groove even if the material, out of which the groove has been machined, is softer than the material of the clamping means.

Although the discussion has previously concerned axisymmetrical components of turbomachines, it should nevertheless be noted, in principle, that the invention is suitable, in principle, for removing in a simple manner any sealing means held in a groove by a clamping means. It is immaterial to the application of the invention whether parts of a compressor, a gas turbine, a steam turbine, a pump, a generator or any other appliance are involved in the component.

With respect to the high costs occurring during the overhaul of the turbines, it is also advantageous to employ the process to release a sealing strip from a groove of a component, for example of a rotor or a casing of a turbomachine, in particular a steam turbine or gas turbine. As mentioned at the beginning, such a sealing strip is held in a groove of the component by a clamping means. In order to release such a sealing means, the fluid jet is directed between the sealing means and the component, by means of which the sealing means is released from the groove. As an alternative, the fluid jet can be directed between the sealing means and the clamping means, by which means the clamping means at least is released from the groove and the sealing means is subsequently easily removed from the groove, for example manually. A time saving of between 75 and 90% is achieved in this way, as compared with the previous turning method for removing a sealing strip inserted in a turbomachine by means of a calking wire. After the release of the clamping means, a replacement sealing means can be fitted in a simple manner.

It is advantageous for the fluid jet to be guided along the groove. By this means, the sealing means or the clamping means is released continuously from the groove.

The method is advantageously employed for releasing a steel wire from a steel groove. In the process, both the material, from which the groove has been machined, and the wire can be in highly alloyed or highly heat-resistant steel. The material of the groove can also, however, be in cast steel, for example gray cast iron, whereas the wire is in a highly alloyed steel. The method can also be advantageously employed in those cases where the material of the clamping means is capable of a higher mechanical resistance than the material of the groove.

In a further advantageous embodiment of the invention, a metallic calking element, as the clamping means for retaining the sealing means embodied as a sealing strip, is released from the groove of a rotor or a casing of a turbomachine, in particular a turbocompressor, a steam turbine or a gas turbine.

The fluid jet is advantageously ejected at a pressure between 750 and 4000 bar. The selection of the pressure then depends on the material of the clamping means, on the material of the sealing means and on the material of the component. In order, in particular, to remove a metallic clamping means in the form of a metallic calking wire for retaining a sealing strip in a turbomachine, it has been found advantageous for the fluid jet to be ejected at a pressure between 2000 and 3000 bar. The clamping means is then easily released from the groove without mechanical damage occurring to the component.

In a particularly advantageous alternative of the invention, water is used as the fluid. When water is used, no complicated measures are needed to meet environmental requirements.

A fluid jet is expediently employed whose width at the impingement location in the groove is between 0.5 and 1.5 times as large as the width of the groove. The successful release of a clamping means, which is very firmly inserted in the groove, depends mainly on the pressure which the fluid jet generates in the groove under the clamping means. This pressure depends on the fluid quantity which is introduced per time under the clamping means, and the velocity with which the fluid impinges within the groove. The pressure generated under the clamping means becomes greater as the amount of fluid introduced into the groove per time is increased. If a narrow fluid jet is used, the pressure which may be necessary can only be achieved by a very high velocity of the fluid. Due to this, however, the groove can be washed out, i.e. it can change its shape, which is undesirable. Tests have shown that a fluid jet which is at least half as wide as the groove at the impingement location in the groove produces a particularly good effect with respect to the removal of the clamping means. If the jet is substantially wider than the groove, the only result is that a large quantity of fluid is used for a scarcely altered efficiency of the fluid.

The sealing means and/or the clamping means are advantageously held tight during the release procedure from the groove. It is expedient for the element under which the fluid jet is deflected to be held tight. Without holding tight in such a manner, the respective element would flutter in the fluid jet or would be bent away by the fluid and possibly fracture. Fracture of the element to be removed has, however, a negative effect because the fluid can develop less pressure under the stump remaining in the groove than it can under an intact element in the region of the jet.

An exemplary embodiment of the invention is explained in more detail using a drawing which includes three figures. In these:

Figure 1:
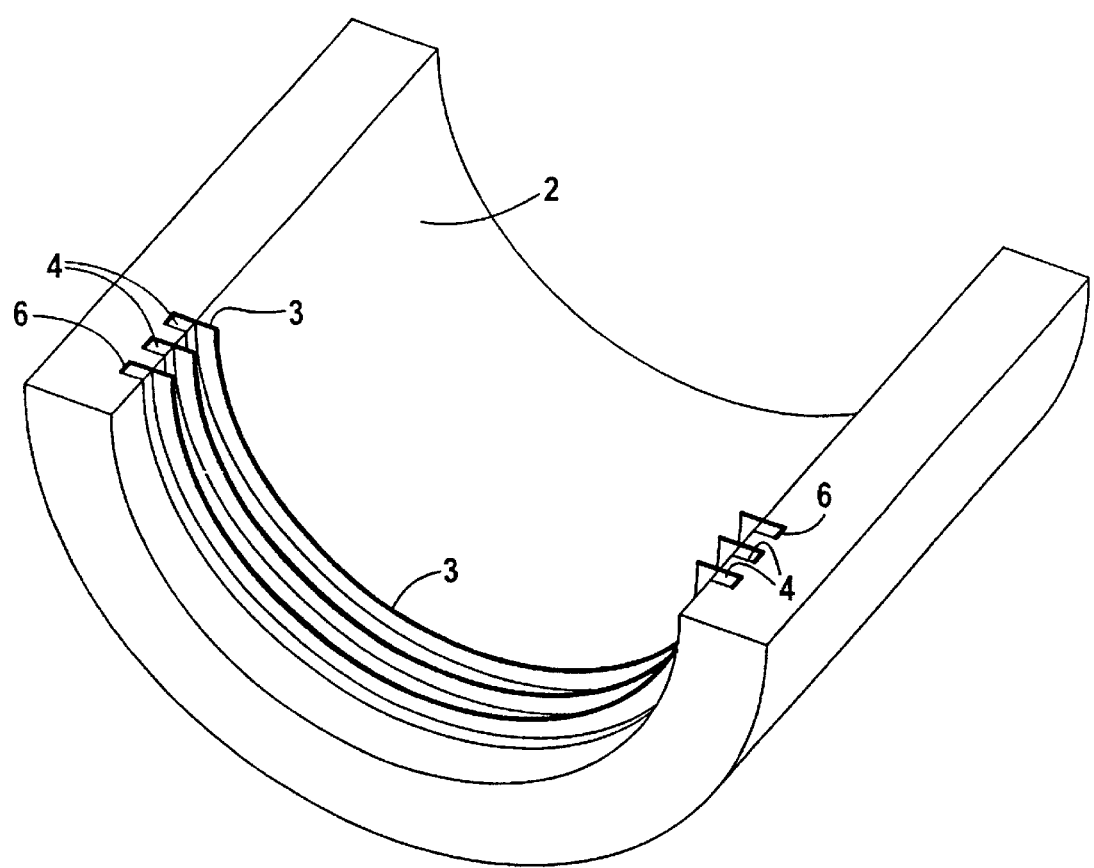
FIG. 1 shows, in a perspective representation, a part of a steam turbine casing, a sequence of sealing strips being inserted into the casing.

FIG. 1 shows, in a perspective representation, a part of a gray cast iron casing 2 of a steam turbine. The part shown is the half of a hollow cylinder, within which the rotor (not shown) of the steam turbine rotates. In order to seal the gap between the casing 2 and the rotor, a sequence of sealing strips 3, which each protrude into the gap, are inserted one behind the other on the casing 2, viewed in the axial direction of the rotor. In order to simplify the representation, only three of these sealing strips 3 are shown. Sealing strips, which are arranged on the rotor, engage in each case between two adjacent sealing strips 3 of the casing 2. So-called labyrinth sealing of the gap between the rotor and the casing 2 is therefore involved.

Each sealing strip 3 is fastened in a groove 6 in the casing 2 by a metallic clamping means 4. The clamping means is a calking wire in a highly alloyed steel.

Figure 2:
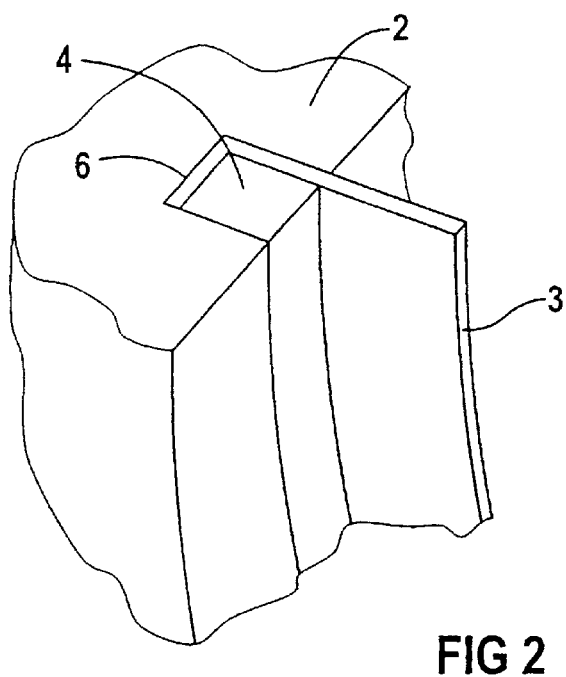
FIG. 2 shows, in a perspective representation, an enlarged excerpt from FIG. 1 to elucidate the fastening of the sealing strip in the casing.

The fastening of the sealing strip 3 on the casing 2 is clearly visible, in an enlarged representation, in FIG. 2. On its fastening side, the sealing strip 3 has an L-shaped embodiment. The fastening side of the sealing strip 3 is inserted into the groove 6 of the casing 2 and is subsequently firmly pressed in or caulked in mechanically with the clamping means 4. The result is, therefore, an enduring and mechanically stable connection between the sealing strip 3 and the casing 2. The same, of course, also applies mutatis mutandis in the case of the rotor.

Figure 3:
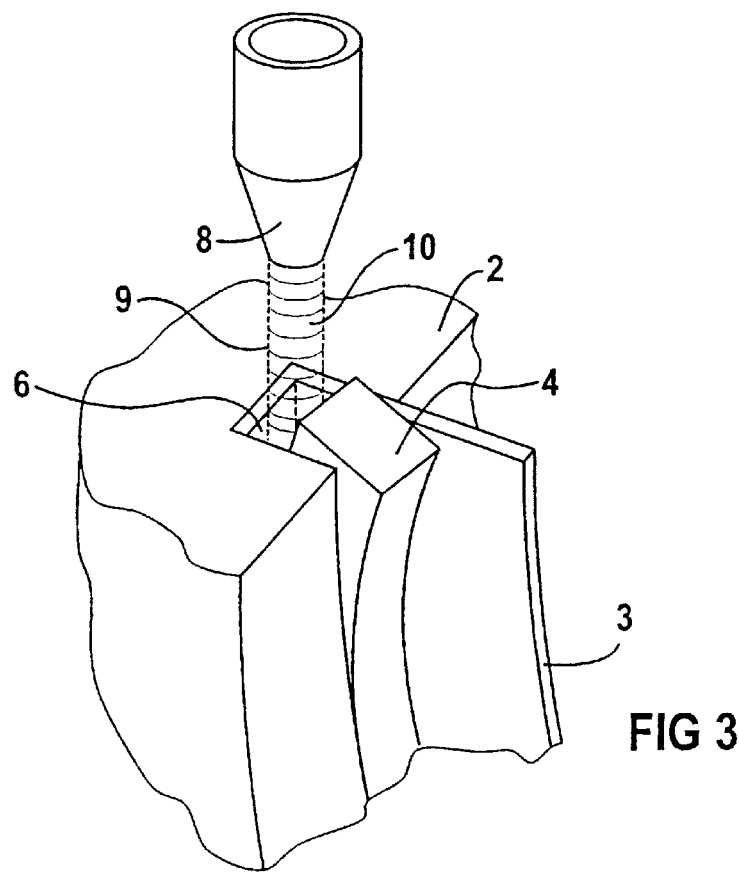
FIG. 3 shows, in a diagrammatic representation, the removal of the sealing strip shown in FIG. 1 by means of a directed fluid jet.

FIG. 3 shows how the sealing strip 3 is removed from the groove 6 of the casing if, for example, it can no longer ensure its sealing function due to mechanical wear. Fluid is brought to a pressure of between 2000 bar and 3000 bar in a high-pressure unit (not shown in any more detail). Water is employed as the fluid. By means of a nozzle 8, a fluid jet 9 is directed at high pressure between the clamping means 4 and the sealing strip 3. In this way, the clamping means 4 is released from the sealing strip 3 in the groove 6 and, because of the high pressure of the fluid, is pressed out of the groove 6. In the case represented, the method is started at the position shown. The fluid jet 9 is then guided along the groove 6 by means of the nozzle 8 by which means the clamping means 4 is gradually released from the groove 6. During the release procedure, the clamping means 4 is continuously held tight by means of a suitable appliance. The nozzle 8 can follow the curvature of the groove 6 continuously and, to this extent, always direct the fluid jet 9 between the sealing strip 3 and the clamping means 4.

At the impingement location in the groove, the width of the fluid jet is approximately 1 mm, the groove 6 having a width of 1.5 mm and the clamping means 4 a width of 1.25 mm. The fluid jet 9 is therefore 0.67 times as wide as the groove 6 and 0.8 times as wide as the clamping means 4.

What is claimed is:

1. A method for removing a seal held by a clamping device in a groove of a component, comprising:

directing a fluid jet into the groove at high pressure between at least one of the seal and the clamping device, and the clamping device and the component, by which at least the clamping device is released from the groove; and removing the seal from the groove.

2. The method as claimed in claim 1, wherein the fluid jet is guided along the groove.

3. The method as claimed in claim 2, wherein a steel wire, as the clamping device, is released from a steel groove.

4. The method as claimed in claim 2, wherein a metallic calking element, as the clamping device for retaining the seal embodied as a sealing strip, is released from the groove of at least one of a rotor and a casing of a turbomachine.

5. The method as claimed in claim 2, wherein the fluid jet is ejected at a pressure between 750 and 4000 bar.

6. The method as claimed in claim 2, wherein water is used as the fluid.

7. The method as claimed in claim 2, wherein the width of the fluid jet at an impingement location in the groove is between 0.5 and 1.5 times as large as the groove width.

8. The method as claimed in claim 2, wherein at least one of the seal and the clamping device are held tight during the release procedure from the groove.

9. The method as claimed in claim 1, wherein a steel wire, as the clamping device, is released from a steel groove.

10. The method as claimed in claim 9, wherein a metallic calking element, as the clamping device for retaining the seal embodied as a sealing strip, is released from the groove of at least one of a rotor and a casing of a turbomachine.

11. The method as claimed in claim 1, wherein a metallic calking element, as the clamping device for retaining the seal embodied as a sealing strip, is released from the groove of at least one of a rotor and a casing of a turbomachine.

12. The method as claimed in claim 1, wherein the turbomachine is at least one of a turbocompressor, a steam turbine and a gas turbine.

13. The method as claimed in claim 1, wherein the fluid jet is ejected at a pressure between 750 and 4000 bar.

14. The method as claimed in claim 1, wherein water is used as the fluid.

15. The method as claimed in claim 1, wherein the width of the fluid jet at an impingement location in the groove is between 0.5 and 1.5 times as large as the groove width.

16. The method as claimed in claim 1, wherein at least one of the seal and the clamping device are held tight during the release procedure from the groove.

17. The method as claimed in claim 1, wherein the fluid jet is ejected at a pressure between 2000 and 3000 bar.

* * * * *